United States Patent Office 3,155,727
Patented Nov. 3, 1964

3,155,727
REACTION OF AROMATIC AMINES WITH PARA HALO NITROBENZENES USING COPPER CYANIDE CONDENSATION CATALYST
Farris H. Wilson, Jr., Cuyahoga Falls, Ohio, assignor to The Goodyear Tire & Rubber Company, Akron, Ohio, a corporation of Ohio
No Drawing. Filed July 25, 1960, Ser. No. 44,888
9 Claims. (Cl. 260—571)

This invention relates to the reaction of aromatic amines with para halo nitrobenzenes and is particularly concerned with a new catalyst for promoting such reactions.

Various catalysts have been used in condensation reactions. For example, many acids, such as the halide acids, sulfuric acids, sulfonic acids, etc., are known to influence amine condensation reactions. Also, certain copper compounds have been used to promote chemical reactions. For example, cuprous acetate, cuprous carbonate, cuprous sulfide, cuprous oxide, cuprous nitrate, cupric oxide, cuprous sulphate and mixtures of copper with a halide such as iodine have been used in promoting various chemical reactions. These compounds have not proved to be particularly satisfactory in promoting the condensation of aromatic amines with halo nitrobenzenes. Although aliphatic amine reactions can be catalyzed rather easily, reactions involving the condensation of aromatic amines with para halo nitrobenzenes have not proved to be easily catalyzed.

It is an object of this invention to provide a catalytic process for the condensation of aromatic amines and para halo nitrobenzenes. It is another object of this invention to provide a new catalyst for the condensation of aromatic amines with para halo nitrobenzenes.

In the practice of this invention it has been discovered that cuprous cyanide uniquely promotes the condensation of aromatic amines with para halo nitrobenzenes to provide a substantial proportion of condensation products from the reactants. The reaction appears to work best in the presence of a basic material which functions as a hydrogen halide acceptor or neutralizing agent. Also, the process appears to work best when some means is provided for the removal of formed water. Any known method can be used, such as a refluxing system, etc.

The aromatic amines which can be condensed with the para halo nitrobenzenes can be defined as primary aromatic amines conforming to the following structural formula:

$$R—NH_2$$

wherein R is selected from (1) phenyl radicals conforming to the following structural formula:

wherein R' is selected from the group consisting of hydrogen, alkyl radicals containing from 1 to 9 carbon atoms, alkoxy radicals containing from 1 to 9 carbon atoms and cycloalkyl radicals in which the cycloalkyl ring contains from 5 to 6 carbon atoms, halogen radicals, and wherein x is an integer ranging from 1 to 3; (2) naphthyl radicals conforming to the following structure:

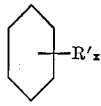

wherein R' is selected from the group consisting of hydrogen, alkyl radicals containing from 1 to 9 carbon atoms, alkoxy radicals containing from 1 to 9 carbon atoms, and cycloalkyl radicals in which the cycloalkyl ring contains from 5 to 6 carbon atoms and halogen radicals, and wherein y is an integer ranging from 1 to 5. Examples of alkyl, alkoxy and cycloalkyl radicals include methyl, ethyl, propyl, butyl, amyl, hexyl, heptyl, octyl, nonyl, methoxy, ethoxy, propoxy, butoxy, amyloxy, hexyloxy, nonoxy, cyclopentyl, cyclohexyl, methyl cyclohexyl and similar radicals.

Obviously, the corresponding diamines, triamines, and other polyamines may also be used in the practice of the invention.

The para halo nitrobenzenes of this invention can be defined as para halo nitrobenzenes conforming to the following structural formula

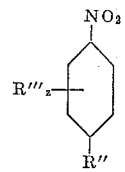

wherein R'' is a halogen selected from the group consisting of chlorine and bromine, and R''' is selected from the group consisting of hydrogen and alkyl radicals containing from 1 to 9 carbon atoms and z is an integer ranging from 1 to 2.

The molar relationship between the aromatic amines and the para nitro halobenzenes is not critical, although it is preferred to have a slight excess of amine in order to insure best results. The roller relationship can vary from 1 mole of the primary aromatic amine to 3 moles of para nitro halobenzene to 6 moles of the primary aromatic amine to 1 mole of para nitro halobenzene. Although equimolecular proportions provide substantially complete reaction, it is preferred to react about 2.5 molar proportions of the aromatic amine with 1 molar proportion of para nitro halobenzene.

The condensation reaction works best in the presence of a basic material which neutralizes the system and which can be used to remove generated hydrogen halide. Preferably, alkali metal salts of carbonic acid such as the carbonates and bicarbonates of lithium, sodium, and potassium are used. Also, the oxides of the alkali metals may be used as well as weak hydroxides. More specifically, sodium and potassium carbonate are most useful with potassium carbonate being preferred.

The reactions can be run over a wide range of temperatures. The temperature used should be high enough to give reaction rates that will produce good yields of the desired products in a reasonable time. It is obvious that the temperature should not exceed the decomposition temperature of the reactants or the temperature at which the oxidizing action of the nitro group interferes with the reactions. The temperatures used can vary from about 125° C. to 260° C. The preferred temperature for good reaction rates and high yield of product is in the range of from about 185° C. to 200° C.

In the practice of this invention, it is desirable to remove the water formed in the condensation reactions. This may be done by use of any of the customary solvents such as benzene, toluene, xylene, etc., in an autoclave with re-cycle and a water trap, fractionating column, or any other device suitable for the removal of water from the reaction.

The time of reaction will depend upon the reactants being used and will customarily be between 1 and 20 hours although most reactions are substantially completed in about 10 hours.

The amount of catalyst used will be within the customary range of catalytic proportions, for example, from a trace, e.g. 0.01% by weight to about 5.0% by weight, based on the total weight of reactants and will preferably be from about 0.2% to 1.0% by weight, based on the weight of reactants present.

Representative examples of amines that can be used in the invention are ortho-toluidine, meta-toluidine, para-toluidine, 2,4-xylidine, 2,5-xylidine, 2,6-xylidine, 2,3-xylidine, ortho-ethylaniline, meta-ethylaniline, para-ethylaniline, 2,4-diethylaniline, 2,6-diethylaniline, amylaniline, 2,3,4-trimethylaniline, 2,4,5-trimethylaniline, 2,4,6-trimethylaniline, ortho-anisidine, meta-anisidine, para-anisidine, 2,4-dimethoxy aniline, 2,5-dimethoxy aniline, 2,6-dimethoxy aniline, trimethoxy aniline, 4-cyclohexylaniline, 4-cyclopentyl aniline, ortho-chloroaniline, para-chloroaniline, meta-chloroaniline, ortho-bromoaniline, meta-bromoaniline, para-bromoaniline, ortho-fluoroaniline, meta-fluoroaniline, para-fluoroaniline, ortho-iodoaniline, meta-iodoaniline, para-iodoaniline, alpha naphthyl amine (1-naphthyl amine), beta naphthyl amine (2-naphthyl amine), 2-methyl-1-naphthyl amine, 1-methyl-2-naphthyl amine, 2-methoxy-1-naphthyl amine, 1-methoxy-2-naphthyl amine, 5-methyl-1-naphthyl amine, 5-methyl-2-naphthyl amine, 5-methoxy-1-naphthyl amine, 5-methoxy-2-naphthyl amine, 1,4,5-trimethyl-2-naphthyl amine, 2,4,5-trimethyl-1-naphthyl amine, 2-cyclopentyl-1-naphthyl amine, 2-cyclohexyl-1-naphthyl amine, 1-cyclopentyl-2-naphthyl amine, 1-cyclohexyl-2-naphthyl amine, 2-chloro-1-naphthyl amine, 2-bromo-1-naphthyl amine, 2-fluoro-1-naphthyl amine, 2-iodo-1-naphthyl amine, 1-chloro-2-naphthyl amine, 1-bromo-2-naphthyl amine, 1-fluoro-2-naphthyl amine, 1-iodo-2-naphthyl amine, and various ring substituted naphtyl amines in which the substituent radicals are in various positions on the naphthyl rings; diamines such as ortho phenylene diamine, meta phenylene diamine, para phenylene diamine, 1,5-naphthalene diamine, and 1,8-naphthalene diamine and triamines such as 1,5,8-naphthalene triamine.

Representative examples of the para halo nitrobenzenes which can be used in the invention are
2-methyl-4-chloronitrobenzene,
3-methyl-4-chloronitrobenzene,
2-ethyl-4-chloronitrobenzene,
3-ethyl-4-chloronitrobenzene,
2,3-dimethyl-4-chloronitrobenzene,
2,5-dimethyl-4-chloronitrobenzene,
2,6-dimethyl-4-chloronitrobenzene,
3,5-dimethyl-4-chloronitrobenzene,
2-methyl-4-bromonitrobenzene,
3-methyl-4-bromonitrobenzene,
2-ethyl-4-bromonitrobenzene,
3-ethyl-4-bromonitrobenzene,
2,3-dimethyl-4-bromonitrobenzene,
2,5-dimethyl-4-bromonitrobenzene,
2,6-dimethyl-4-bromonitrobenzene and
3,5-dimethyl-4-bromonitrobenzene.

The following examples further illustrate the invention although the invention is not limited thereto.

*Example 1*

One hundred grams of para nitrochlorobenzene, 150 grams of aniline, 50 grams of potassium carbonate and 1 gram of cuprous cyanide were mixed together and heated at a temperature between 185° and 199° C. for 10 hours during which time the mixture was stirred and formed water was removed by means of a water trap. Thereafter, the reaction was cooled to 110° C. and 100 milliliters of water were added to the mixture. The mixture was thereafter poured into 1 liter of water after which the formed product separated as pasty pellets. The water was decanted, the product washed and the wash water extracted with 200 milliliters of benzene. Thereafter, additional benzene was added to the product and refluxed, the water being removed by means of a water trap. The benzene was distilled off and the residue distilled under vacuum. Eighty-three grams of unreacted aniline and para nitrochlorobenzene came off at temperatures up to 80° C. 111.5 grams of product came off at a temperature of 170° C. to 210° C. while maintaining from .4 to .8 millimeters of pressure to yield para nitrodiphenyl amine having a melting point of 129–132° C.

The invention has been particularly illustrated with respect to the preparation of para nitrodiphenyl amine by reacting para nitrochlorobenzene with aniline. By proper selection of the amine and para halo nitrobenzene reactants and reacting them in the presence of the cuprous cyanide catalyst of the invention and an acid acceptor other substituted diphenylamines can be prepared. For example, 2-methyl-4'-nitrodiphenylamine can be made by reacting orthotoluidine and para-chloronitrobenzene, 4-methyl-4'-nitrodiphenylamine can be made by reacting para-toluidine and para-chloronitrobenzene, 2-methoxy-4'-nitrodiphenylamine can be made by reacting ortho-anisidine and para-chloronitrobenzene and 4-methoxy-4'-nitrodiphenylamine can be made by reacting para-anisidine and para-chloronitrobenzene.

Representative examples of other amines of the invention are
2-chloro-4'-nitrodiphenylamine,
4-chloro-4'-nitrodiphenylamine,
2-methyl-4-nitrodiphenylamine,
alpha-naphthyl-para-nitrophenylamine
beta-naphthyl-para-nitrophenylamine,
4-cyclohexyl-4'-nitrodiphenylamine,
2,5-dimethoxy-4'-nitrodiphenylamine,
2,4-dimethyl-4-nitrodiphenylamine,
2-chloro-5-methyl-4'-nitrodiphenylamine.

This application is a continuation-in-part of application Serial No. 724,795 filed March 31, 1958, now abandoned.

While certain representative embodiments and details have been shown for the purpose of illustrating the invention, it will be apparent to those skilled in this art that various changes and modifications may be made therein without departing from the spirit or scope of the invention.

I claim:

1. A process for condensing a primary aromatic amine conforming to the following general formula $$R-NH_2$$

wherein R is selected from (1) phenyl radicals conforming to the following general formula

wherein R' is selected from the group consisting of hydrogen, alkyl radicals containing from 1 to 9 carbon atoms, alkoxy radicals containing from 1 to 9 carbon atoms, cycloalkyl radicals in which the cycloalkyl ring contains from 5 to 6 carbon atoms and halogen radicals and wherein $x$ is an integer ranging from 1 to 3; (2) naphthyl radicals conforming to the following structure

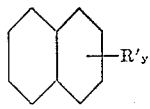

wherein R' is selected from the group consisting of hydrogen, alkyl radicals containing from 1 to 9 carbon atoms, alkoxy radicals containing from 1 to 9 carbon atoms, cycloalkyl radicals in which the cycloalkyl ring contains from 5 to 6 carbon atoms and halogen radicals and wherein $y$ is an integer ranging from 1 to 5 with a para halo nitrobenzene which conforms to the following structural formula

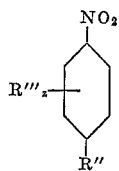

wherein R″ is a halogen selected from the group consisting of chlorine and bromine and R‴ is selected from the group consisting of hydrogen and alkyl radicals containing from 1 to 9 carbon atoms and $z$ is an integer ranging from 1 to 2 which comprises reacting the primary aromatic amine with the para halo nitrobenzene in the ratio of from 1 to 6 moles of the primary aromatic amine to 3 to 1 moles of the para halo nitrobenzene in the presence of a basic material selected from the group consisting of oxides, hydroxides and carbonates of the alkali metals which neutralizes the hydrogen halide formed and in the presence of a catalytic amount of cuprous cyanide at a temperature of from 125° C. to 260° C. and removing water from the reaction mixture.

2. The process of claim 1 in which the primary aromatic amine used is aniline.

3. The process of claim 1 in which the para halo nitrobenzene used is para chloro nitrobenzene.

4. The process of claim 3 in which the basic material used to neutralize the hydrogen halide formed is potassium carbonate.

5. The process for preparing 2-methyl-4′-nitro diphenylamine which comprises reacting from 1 to 6 moles of ortho toluidine with from 3 to 1 moles of para chloro nitrobenzene in the presence of potassium carbonate and a catalytic amount of cuprous cyanide at a temperature in the range of from 125 to 260° C. and removing water from the reaction mixture.

6. The process for preparing 4-methyl-4′-nitro diphenylamine which comprises reacting from 1 to 6 moles of para toluidine with from 3 to 1 moles of para chloro nitro-benzene in the presence of potassium carbonate and a catalytic amount of cuprous cyanide at a temperature in the range of from 125 to 260° C. and removing water from the reaction mixture.

7. The process for preparing 2-methoxy-4′-nitro-diphenylamine which comprises reacting from 1 to 6 moles of ortho anisidine with from 3 to 1 moles of para chloro nitrobenzene in the presence of potassium carbonate and a catalytic amount of cuprous cyanide at a temperature in the range of from 125 to 260° C. and removing water from the reaction mixture.

8. The process for preparing 4-methoxy-4′-nitro diphenylamine which comprises reacting from 1 to 6 moles of para anisidine with from 3 to 1 moles of para chloro nitrobenzene in the presence of potassium carbonate and a catalytic amount of cuprous cyanide at a temperature in the range of from 125 to 260° C. and removing water from the reaction mixture.

9. The process which comprises reacting aniline with para chloro nitrobenzene in the ratio of from 1 to 2.5 moles of aniline to 1 mole of para chloro nitrobenzene at a temperature of from 185 to 200° C. in the presence of from 0.01 to 5.0% by weight, based on the total weight of the reactants, of cuprous cyanide and from 6 to 30% by weight, based on the total weight of the reactants, of potassium carbonate and removing water from the reaction mixture.

References Cited in the file of this patent

UNITED STATES PATENTS

| | | |
|---|---|---|
| 2,476,170 | Widiger | July 12, 1949 |
| 2,700,060 | Cherlow et al. | Jan. 18, 1955 |
| 2,927,943 | Merz | Mar. 8, 1960 |

FOREIGN PATENTS

| | | |
|---|---|---|
| 185,663 | Germany | May 14, 1907 |
| 250,819 | Great Britain | Apr. 22, 1926 |
| 507,860 | Great Britain | June 22, 1939 |